(12) United States Patent
Nolte

(10) Patent No.: US 11,808,485 B2
(45) Date of Patent: Nov. 7, 2023

(54) TANKLESS WATER HEATER AND ELECTRONIC POINT OF USE WATER HEATER COMPRISING THE SAME

(71) Applicant: STIEBEL ELTRON GMBH & CO. KG, Holzminden (DE)

(72) Inventor: Hubert Nolte, Hoexter (DE)

(73) Assignee: Stiebel Eltron GMBH & CO. KG, Holzminden (DE)

( * ) Notice: Subject to any disclaimer, the term of this patent is extended or adjusted under 35 U.S.C. 154(b) by 474 days.

(21) Appl. No.: 16/893,825

(22) Filed: Jun. 5, 2020

(65) Prior Publication Data

US 2020/0386440 A1    Dec. 10, 2020

(30) Foreign Application Priority Data

Jun. 7, 2019 (DE) .......................... 102019004320.0

(51) Int. Cl.
| | | |
|---|---|---|
| *F24H 1/10* | (2022.01) | |
| *H05B 3/82* | (2006.01) | |
| *F24H 9/20* | (2022.01) | |
| *G01F 1/05* | (2006.01) | |
| *G01K 13/02* | (2021.01) | |

(52) U.S. Cl.
CPC ............ *F24H 1/101* (2013.01); *F24H 9/2028* (2013.01); *G01F 1/05* (2013.01); *G01K 13/02* (2013.01); *H05B 3/82* (2013.01); *F24D 2200/08* (2013.01); *F24D 2220/0271* (2013.01); *F24D 2220/042* (2013.01); *F24D 2220/044* (2013.01); *G01K 13/026* (2021.01)

(58) Field of Classification Search
CPC ......... F24D 2200/08; F24D 2220/0271; F24D 2220/042; F24D 2220/044; F24H 1/101; F24H 1/106; H05B 1/0283
See application file for complete search history.

(56) References Cited

U.S. PATENT DOCUMENTS

2018/0119988 A1\*    5/2018 Nolte .................... F24H 9/2028

FOREIGN PATENT DOCUMENTS

| DE | 4303325 A1 | 8/1994 |
|---|---|---|
| DE | 19725977 C2 | 11/2001 |

\* cited by examiner

*Primary Examiner* — Kun Kai Ma
(74) *Attorney, Agent, or Firm* — Brooks Kushman P.C.

(57) ABSTRACT

A water heater including an inflow terminal for connecting a tankless water heater to a cold water supply and an outflow terminal for connecting the tankless water heater to a tap. A fluid channel proves a fluid connection from the inflow terminal to the outflow terminal. A heat element arrangement is arranged at or within at least a section of the fluid channel for transferring heat to fluid present within the fluid channel. An electronic controller is configured to control a heating power provided to the heat element arrangement. A flow sensor is arranged at or within the fluid channel downstream the heat element arrangement. The electronic controller is further configured to detect the presence of air bubbles within the fluid channel based on a change of a flow signal provided by the flow sensor and to adapt the heating power provided to the heat element arrangement in reaction to the determination of air bubbles.

11 Claims, 1 Drawing Sheet

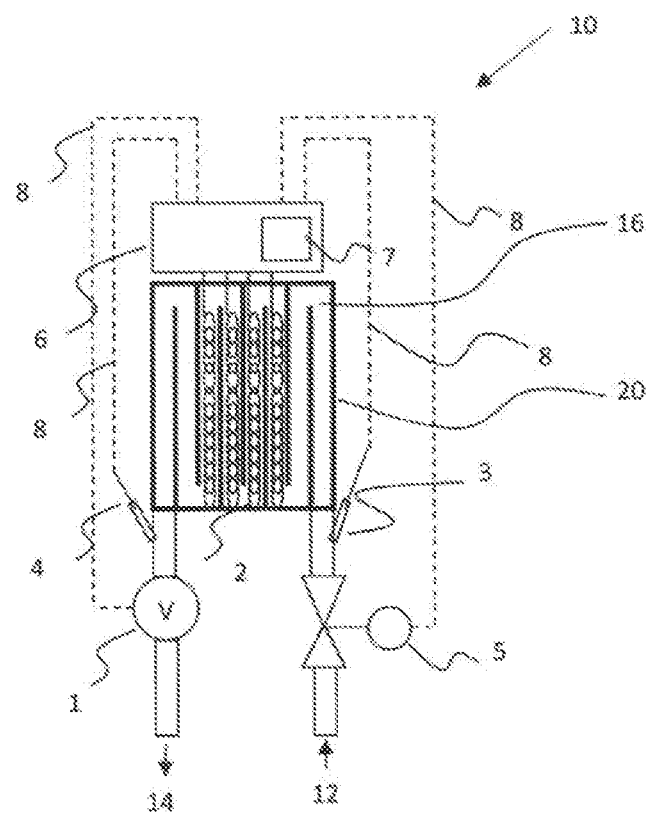

TANKLESS WATER HEATER AND ELECTRONIC POINT OF USE WATER HEATER COMPRISING THE SAME

CROSS-REFERENCE TO RELATED APPLICATIONS

This application claims priority to German patent application Serial No. DE 10 2019 004 320.0 filed Jun. 7, 2019, the disclosure of which is hereby incorporated in its entirety by reference herein.

TECHNICAL FIELD

The present invention relates to a tankless water heater and an electronic point of use water heater comprising the tankless water heater.

BACKGROUND

Tankless water heaters are widely known for residential and industrial applications. Bubbles of air present within the fluid channel inside the tankless water heaters can lead to overheating heat elements, leading to damages of the tankless water heater or even to a fire resulting from the overheating.

Tankless water heaters equipped with an air detection system to avoid overheating are known, for instance, from DE 197 25 977 C2 or DE 43 03 325 A1.

In DE 43 03 325 A1, a tankless water heater comprising two distinct flow meters is described, wherein one flow meter is arranged upstream a heater element near the cold end and the other flow meter is arranged downstream the heater element at the hot end. A simultaneous change of the flow signals determined by each of the flow sensors, respectively, is identified as air bubbles in the water supply line of a tankless water heater.

In DE 197 25 977 C2 it is disclosed that air bubbles in the water supply of the heater reduce the rotation rate of a spinning wheel flow sensor compared to a pure water supply without air bubbles. The characteristic frequency pattern of the instantaneous change rate of the rotation speed of the spinning wheel is used to detect air bubbles using an electronic detection and evaluation circuit.

In the known applications the flow sensor is arranged in the cold water supply so that it is reliably possible to determine air bubbles that enter the tankless water heater. However, due to the fact that a certain air amount is diluted in the water, e.g. the drinking water supply, entering the tankless water heater, air is released from the water once the water is heated in a heating chamber of a water heater assemble, e.g. a tankless water heater.

In case a plurality of heat elements are arranged in row in a multiple heat element arrangement, at least the last heating element downstream of the heat element arrangement will receive air contaminated water due to the upstream heating process. In the consequence, the respective heating element will not be cooled properly and likely overhead because of the air contamination.

It has therefore been an object of the present invention to provide a tankless water heater and an electronic point of use water heater which allows for a reliable determination of air bubbles in the fluid channel irrespective of their origin, i.e. irrespective of whether they originate from the cold water supply or are present on the hot side of the heating chamber due to the heating process.

SUMMARY

According to a first aspect, a tankless water heater is provided. The tankless water heater comprises an inflow terminal for connecting the tankless water heater to a cold water supply, an outflow terminal for connecting the tankless water heater to a tap, a fluid channel providing a fluid connection from the inflow terminal to the outflow terminal, a heat element arrangement, arranged at or within at least a section of the fluid channel for transferring heat to fluid present within the fluid channel, an electronic controller configured to control a heating power provided to the heat element arrangement. The tankless water heater further comprises a flow sensor being arranged at or within the fluid channel downstream the heat element arrangement, wherein the electronic controller is configured to detect the presence of air bubbles within the fluid channel based on a change of a flow signal provided by the flow sensor and to adapt the heating power provided to the heat element arrangement in reaction to the determination of air bubbles.

Since the flow sensor is arranged downstream of the heat element arrangement, the flow sensor detects both air bubbles that enter the tankless water heater through the cold water supply and air bubbles generated due to the heating by the heat element arrangement. Compared to previously known solutions, also the determination of air bubbles which are generated by the heat element arrangement is thus possible. Further, a reliable determination can be achieved with a single flow sensor, such that the overall system complexity is reduced. To this end, the subtle evaluation of a change of the flow signal provided by the sole flow sensor by the electronic controller allows for an efficient determination of the presence of bubbles.

The heat element arrangement preferentially comprises a plurality of heat elements which are arranged at least partly in row with respect to the fluid channel. Thus, downwardly arranged heat elements will receive a flow of fluid with a higher temperature compared to heat elements arranged further upstream in reaction the heating power transmitted to the fluid by the upstream heat elements. Downstream heat elements are more likely to be subjected with air bubbles in the fluid channel.

Some of the plurality of heat elements are further preferably arranged in parallel to maximize the heat transfer to the fluid by dividing the flow into parallel channels.

In a preferred embodiment, the tankless water heater further comprises a first temperature sensor configured to determine a temperature of fluid within the fluid channel upstream the heat element arrangement and a second temperature sensor configured to determine a temperature of fluid within the fluid channel downstream the heat element arrangement.

The provision of two temperature sensors allows an efficient control of the tankless water heater to achieve a desired set point at the outflow terminal by the electronic controller.

In a preferred embodiment, the second temperature sensor is arranged between the flow sensor and the heat element arrangement with respect to the fluid channel.

In a preferred embodiment, the electronic controller comprises a set point monitoring device configured to adapt the heating power provided to the heat element arrangement based on a difference between the temperature determined by the second temperature sensor and a predetermined set temperature.

In a preferred embodiment, the tankless water heater further comprises a throttle valve, wherein the set point monitoring device is configured to decrease the flow rate using the throttle valve in case the predetermined set temperature is not met.

In a preferred embodiment, the set point monitoring device is configured to adjust the flow rate using the throttle valve in reaction to the temperature determined by the first temperature sensor. The flow rate reduction is particularly beneficial, for instance, in case a low inflow temperature is determined by the first temperature sensor, such that the temperature increase which should be generated by the heating power of the heat element arrangement would exceed the maximum power of the heat element arrangement in case of a larger, i.e. not reduced, flow rate.

In a preferred embodiment, at least the flow sensor, the fluid channel, the heat element arrangement and the electronic controller are arranged within a housing.

In a preferred embodiment, the flow sensor comprises a spinning wheel, wherein the flow signal is indicative of a spinning rate of the spinning wheel. A higher spinning rate of the spinning wheel corresponds to a larger flow of fluid while air bubbles present in the fluid channel will reduce the spinning rate of the spinning wheel and thus the provided flow signal.

In a preferred embodiment, the electronic controller is configured to delay the onset of providing heating power to the heat element arrangement after the flow signal becomes indicative of a start of a tap event. Thereby, overheating at the beginning of a tap event due to air bubbles already present at the location of the heating elements can be avoided.

In a preferred embodiment, the electronic controller is configured to stop the provision of heating power to the heat element arrangement in case a change in flow signal is indicative of the presence of air bubbles. Air bubbles present in the fluid channel are dangerous for the tankless water heater since they eventually result in overheating. Thus, since the heating is stopped upon determination of air in the fluid channel, overheating can reliably be avoided.

In a preferred embodiment, the electronic controller is configured to determine the presence of air bubbles in the fluid channel using a characteristic frequency pattern analysis on the flow signal provided by the flow sensor. The alteration of the flow signal induced by alternating liquid, i.e. generally water, and air passage past the flow sensor induces a change in the flow signal showing a characteristic frequency pattern, which can be evaluated to determine whether air is present or not.

According to a further aspect, an electronic controlled point of use water heater is provided. The electronic controlled point of use water heater comprises the tankless water heater according to the first aspect.

BRIEF DESCRIPTION OF THE DRAWINGS

FIG. 1 schematically and exemplarily illustrates a tankless water heater according to the invention.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the FIGURES can be combined with features illustrated in one or more other FIGURES to produce embodiments that are not explicitly illustrated or described. The combinations of features illustrated provide representative embodiments for typical applications. Various combinations and modifications of the features consistent with the teachings of this disclosure, however, could be desired for particular applications or implementations.

FIG. 1 schematically and exemplarily illustrates a tankless water heater 10 according to an embodiment of the present invention. The tankless water heater 10 comprises in this example an optional housing 20 within which a fluid channel 16 extends from an inflow terminal 12 to be connected to the cold water supply to an outflow terminal 14, which is designed to be connected, for instance, to a tap or other point of use at which warm or hot water is desired.

During its passage through tankless water heater 10, fluid channel 16 is arranged in contact with a heat element arrangement 2 which comprises a plurality of heat elements to transfer heat energy, in particular electric heat energy, to the water within the fluid channel 16.

A single flow sensor 1 is arranged on the hot side downstream the heat element arrangement at or within fluid channel 16. A plurality of different flow sensors 1 for providing a flow signal indicative of a flow through fluid channel 16 are known, preferably, flow sensor 1 comprises a spinning wheel and provides a signal indicative of a spinning speed of the spinning wheel.

Flow sensor 1 is arranged downstream to be capable of detecting air bubbles within fluid channel 16 as a result of air contamination of the incoming water, i.e. water entering tankless water heater 10 through inflow terminal 12, and likewise air bubbles created by the solvent evaporation The temperature range within which water leaves the outflow terminal 14 is preferentially between 40° C. and 100° C., more preferably between 60° C. and 95° C.

Upstream and downstream of heat element arrangement 2 is provided a first temperature sensor 3 and a second temperature sensor 4, respectively. Temperature sensor 3 senses the incoming water side, temperature sensor 4 the outgoing water side after the water was heated by heat element arrangement 2. Additionally, a throttle valve 5 is arranged on the cold or incoming water side and can be used to adjust the flow through fluid channel 16. While throttle valve 5 is illustrated on the cold water side, it is of course contemplated to provide throttle valve 5 on the warm or hot water side since the flow through fluid channel 16 is equal through the entire tankless water heater 10.

An electronic controller 6 is further provided which is configured to control the heating output of the heat element arrangement 2 such that the temperature sensed by temperature sensor 4 is close to a set point temperature, which is preferably defined by a set point monitor device 7, which can be provided integrated in electronic controller 6. In case the available heating power is not enough to satisfactorily heat the water to the desired set point temperature, the flow of water can be reduced by means of throttle valve 5 such that the available heating power is then sufficient. This will, for instance, be the case when the supplied water temperature is low or the designated set point temperature is high.

All sensor elements 1, 3 and 4 as well as throttle valve 5 are illustrated to be connected via a wire 8 to electronic controller 6. It is of course contemplated that one, more or all of the sensor elements can communicate by other means, for instance wirelessly, with electronic controller 6.

Tankless water heater 10 starts heating, more precisely electronic controller 6 supplies energy to heat element arrangement 2, once flow sensor 1 detects a tapping event with a delay to avoid overheating heat element arrangement 2. The delay is applied to ensure that no remaining air bubbles are present in a heating chamber, i.e. the region of fluid channel 16 in which water can be heated by heat element arrangement 2.

Further, upon detection of air bubbles through controller 6 based on sensor signals by flow sensor 1, heating will be stopped. Air bubbles can be determined because of an instantaneous change rate of the rotation speed of the spinning wheel of the flow sensor 1. Additionally or alternatively, a characteristic frequency pattern analysis of the flow sensor signal is used for evaluation by electronic controller 6.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated.

List of Reference Numbers:
1 flow sensor
2 heat element arrangement
3 temperature sensor
4 temperature sensor
5 throttle valve
6 electronic controller
7 set point monitor device
8 wire
10 water heater
12 inflow terminal
14 outflow terminal
16 fluid channel
20 housing

What is claimed is:

1. A tankless water heater comprising:
    an inflow terminal for connecting the tankless water heater to a cold water supply;
    an outflow terminal for connecting the tankless water heater to a tap;
    a fluid channel providing a fluid connection from the inflow terminal to the outflow terminal;
    an electric heating element arranged at or within at least a section of the fluid channel, the electric heating element being configured to heat fluid present within the fluid channel;
    a flow sensor arranged at or within the fluid channel downstream of the heating element; and
    an electronic controller configured to:
        control a heating power provided to the electric heating element,
        detect the presence of air bubbles within the fluid channel based on a change of a flow signal provided by the flow sensor,
        in response to air bubbles being detected, adapt the heating power provided to the electric heating element, and
        delay the onset of providing heating power to the electric heating element after the flow signal becomes indicative of a start of a tap event.

2. The tankless water heater according to claim 1, further comprising:
    a first temperature sensor configured to determine a temperature of fluid within the fluid channel upstream the electric heating element; and
    a second temperature sensor configured to determine a temperature of fluid within the fluid channel downstream the electric heating element.

3. The tankless water heater according to claim 2, wherein the second temperature sensor is arranged between the flow sensor and the heat element arrangement with respect to the fluid channel.

4. The tankless water heater according to claim 2, wherein the electronic controller is further configured to adapt the heating power provided to the electric heating element based on a difference between the temperature determined by the second temperature sensor and a predetermined set temperature.

5. The tankless water heater according to claim 4, further comprising:
    a throttle valve, wherein the electronic controller is further configured to decrease the flow rate using the throttle valve responsive to the predetermined set temperature not being met.

6. The tankless water heater according to claim 5, wherein the electronic controller is further configured to adjust the flow rate using the throttle valve in response to the temperature determined by the first temperature sensor being low.

7. The tankless water heater according to claim 1, wherein at least the flow sensor, the fluid channel, the electric heating element, and the electronic controller are arranged within a housing.

8. The tankless water heater according to claim 1, wherein the flow sensor includes a spinning wheel, and wherein the flow signal is indicative of a spinning rate of the spinning wheel.

9. The tankless water heater according to claim 1, wherein the electronic controller is further configured to stop the provision of heating power to the electric heating element in response to a change in flow signal being indicative of the presence of air bubbles.

10. The tankless water heater according to claim 9, wherein the electronic controller is further configured to determine the presence of air bubbles in the fluid channel using a characteristic frequency pattern analysis on the flow signal provided by the flow sensor.

11. An electronic controlled point of use water heater comprising:
    an inflow terminal for connecting to a cold water supply;
    an outflow terminal for connecting to a tap;
    a fluid channel providing a fluid connection from the inflow terminal to the outflow terminal;
    an electric heating element arranged at or within at least a section of the fluid channel, the electric heating element being configured to heat fluid present within the fluid channel;
    a flow sensor arranged at or within the fluid channel downstream the heating element; and
    an electronic controller configured to:
        control a heating power provided to the electric heating element,
        detect the presence of air bubbles within the fluid channel based on a change of a flow signal provided by the flow sensor, and in response to air bubbles being detected, adapt the heating power provided to the electric heating element such that the heating power is greater than zero.

\* \* \* \* \*